(12) United States Patent
Izumi

(10) Patent No.: US 10,946,484 B2
(45) Date of Patent: Mar. 16, 2021

(54) LASER MACHINING METHOD ADJUSTING FOCUS SHIFT DEPENDING ON TYPE AND LEVEL OF CONTAMINATION OF EXTERNAL OPTICAL SYSTEM BEFORE LASER MACHINING

(71) Applicant: FANUC CORPORATION, Yamanashi (JP)

(72) Inventor: Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 392 days.

(21) Appl. No.: 16/104,271

(22) Filed: Aug. 17, 2018

(65) Prior Publication Data

US 2019/0061065 A1 Feb. 28, 2019

(30) Foreign Application Priority Data

Aug. 23, 2017 (JP) .............................. JP2017-160490

(51) Int. Cl.
| | |
|---|---|
| *B23K 26/70* | (2014.01) |
| *B23K 26/06* | (2014.01) |
| *B23K 26/046* | (2014.01) |
| *B23K 26/066* | (2014.01) |
| *B23K 26/064* | (2014.01) |
| *G01J 1/42* | (2006.01) |

(52) U.S. Cl.
CPC .......... *B23K 26/707* (2015.10); *B23K 26/046* (2013.01); *B23K 26/064* (2015.10); *B23K 26/066* (2015.10); *B23K 26/0648* (2013.01); *B23K 26/0665* (2013.01);

(Continued)

(58) Field of Classification Search
CPC .......................... B23K 26/707; B23K 26/046; B23K 26/0648; B23K 26/064; B23K 26/705; B23K 26/0665; B23K 26/704; G01J 1/4257
See application file for complete search history.

(56) References Cited

U.S. PATENT DOCUMENTS

| | | |
|---|---|---|
| 6,392,192 B1 | 5/2002 | Cole, III et al. |
| 6,804,035 B2 | 10/2004 | Kurosawa |
| 8,158,493 B2 | 4/2012 | Shah et al. |

(Continued)

FOREIGN PATENT DOCUMENTS

| | | |
|---|---|---|
| CN | 1449319 A | 10/2003 |
| CN | 102497952 A | 6/2012 |

(Continued)

OTHER PUBLICATIONS

Machine translation of Japan Patent document No. 8-178,856-A, Nov. 2020.*

(Continued)

*Primary Examiner* — Geoffrey S Evans
(74) *Attorney, Agent, or Firm* — RatnerPrestia

(57) ABSTRACT

A laser machining method includes, before laser machining: calculating the amount of focus movement on the basis of a first measurement value measured with the external optical system warmed up and being the amount of energy of a laser beam passing through a small-diameter hole and a first reference value (database D1) predetermined depending on the type of contamination of the external optical system in relation to the first measurement value; and compensating the focus position in laser machining on the basis of the calculated amount of focus movement.

6 Claims, 14 Drawing Sheets

(52) U.S. Cl.
CPC .......... *B23K 26/704* (2015.10); *B23K 26/705* (2015.10); *G01J 1/4257* (2013.01)

(56) References Cited

U.S. PATENT DOCUMENTS

| | | | |
|---|---|---|---|
| 8,456,523 B2 | 6/2013 | Stork genannt Wersborg | |
| 9,776,280 B2 | 10/2017 | Ogura et al. | |
| 2006/0043077 A1 | 3/2006 | Nittner et al. | |
| 2007/0000889 A1* | 1/2007 | Yamazaki | B23K 26/04 219/121.83 |
| 2016/0031038 A1 | 2/2016 | Matsumoto et al. | |

FOREIGN PATENT DOCUMENTS

| | | |
|---|---|---|
| CN | 105102170 A | 11/2015 |
| CN | 105583526 A | 5/2016 |
| CN | 105598580 A | 5/2016 |
| DE | 10045191 A1 | 5/2001 |
| DE | 102010032800 A1 | 2/2012 |
| DE | 112010003743 B4 | 5/2015 |
| JP | H01178393 A | 7/1989 |
| JP | 08178856 A * | 7/1996 |
| JP | 2005302827 A | 10/2005 |
| JP | 2012187591 A | 10/2012 |
| JP | 2016-002580 A | 1/2016 |
| WO | 2009/066370 A1 | 5/2009 |
| WO | 2014171245 A1 | 10/2014 |

OTHER PUBLICATIONS

Decision to Grant a Patent issued in Japanese Patent Application No. 2017-160490 dated May 21, 2019, 5 pages.

* cited by examiner

FIG. 6

DATABASE (D1)

| TYPE OF CONTAMINATION OF EXTERNAL OPTICAL SYSTEM | FIRST REFERENCE VALUE | | |
|---|---|---|---|
| | VOLTAGE | TEMPERATURE | POWER |
| NORMAL STATE | 0.5V | 74°C | 50W |
| WINDOW CONTAMINATED STATE | 0.4V | 62°C | 40W |
| LENS CONTAMINATED STATE | 0.35V | 55°C | 35W |
| LENS AND WINDOW CONTAMINATED STATE | 0.3V | 48°C | 30W |

FIG. 7

MACHINING CONDITIONS IN NORMAL STATE

| POWER | DUTY | FREQUENCY | SPEED | FOCUS POSITION | NOZZLE DIAMETER | GAS PRESSURE |
|---|---|---|---|---|---|---|
| 3000W | 80% | 5000Hz | 3000mm/min | 1mm | Φ1.5 | 1.2MPa |

MACHINING CONDITIONS (1) AFTER COMPENSATION

| POWER | DUTY | FREQUENCY | SPEED | FOCUS POSITION | NOZZLE DIAMETER | GAS PRESSURE |
|---|---|---|---|---|---|---|
| 3000W | 80% | 5000Hz | 3000mm/min | 0mm | Φ1.5 | 1.2MPa |

MACHINING CONDITIONS (2) AFTER COMPENSATION

| POWER | DUTY | FREQUENCY | SPEED | FOCUS POSITION | NOZZLE DIAMETER | GAS PRESSURE |
|---|---|---|---|---|---|---|
| 3500W | 80% | 5000Hz | 3000mm/min | 1mm | Φ1.5 | 1.2MPa |

MACHINING CONDITIONS (3) AFTER COMPENSATION

| POWER | DUTY | FREQUENCY | SPEED | FOCUS POSITION | NOZZLE DIAMETER | GAS PRESSURE |
|---|---|---|---|---|---|---|
| 3500W | 80% | 5000Hz | 3000mm/min | 0mm | Φ1.5 | 1.2MPa |

FIG. 14

DATABASE (D2)

| AMOUNT OF ENERGY PASSING THROUGH SMALL-DIAMETER HOLE | FIRST REFERENCE VALUE (NORMAL STATE) | 45W |
| --- | --- | --- |
| | THIRD REFERENCE VALUE (LENS CONTAMINATED STATE) | 42W |
| AMOUNT OF ENERGY ABSORBED BY PLATE | SECOND REFERENCE VALUE (WINDOW CONTAMINATED STATE) | 5W |
| | FIFTH REFERENCE VALUE (WINDOW ABSORPTION/SCATTERING STATE) | 7W |

FIG. 15

DATABASE (D3)

| FOURTH REFERENCE VALUE PREDETERMINED DEPENDING ON CONTAMINATION LEVEL OF EXTERNAL OPTICAL SYSTEM (AMOUNT OF ENERGY ABSORBED BY PLATE) | AMOUNT OF FOCUS MOVEMENT PREDETERMINED DEPENDING ON FOURTH REFERENCE VALUE |
|---|---|
| 1W | 0.3mm |
| 1.5W | 0.5mm |
| 2W | 0.7mm |
| 3W | 1.0mm |
| 4W | 2.0mm |
| 5W | 3.5mm |
| 6W | 5.5mm |
| 7W | 8.5mm |
| 8W | 12mm |

LASER MACHINING METHOD ADJUSTING FOCUS SHIFT DEPENDING ON TYPE AND LEVEL OF CONTAMINATION OF EXTERNAL OPTICAL SYSTEM BEFORE LASER MACHINING

CROSS-REFERENCE TO RELATED APPLICATION

This application is a new U.S. Patent Application that claims benefit of Japanese Patent Application No. 2017-160490, filed Aug. 23, 2017, the disclosure of this application is being incorporated herein by reference in its entirety for all purposes.

BACKGROUND OF THE INVENTION

1. Field of the Invention

The present invention relates to laser machining methods, and more particularly relates to a laser machining method adjusting a focus shift depending on the type and level of contamination of an optical system before laser machining.

2. Description of the Related Art

A laser machining device irradiating a workpiece with a laser beam to perform laser machining to the workpiece concentrates the laser beam at a prescribed focus position with a lens and irradiates the workpiece with the concentrated laser beam. In such a laser machining device, in a case where an external optical system guiding the laser beam from a laser oscillator to concentrate the beam on a workpiece surface is contaminated and absorbs the laser beam, so-called thermal lens effect changes the curvature and moves the focus position. Furthermore, depending on the state of contamination, the transmittance of the external optical system is also changed. In a case where a change in the focus position and a change in the transmittance occur, a defect in machining occurs, so that the external optical system is required to be checked whether it is contaminated. This hinders automatic operation.

To solve such a problem, a technique for detecting contamination of an external optical system by mounting a temperature sensor and a scattered light sensor in the external optical system is known. WO 2009/066370 (A1) discloses a laser machining device capable of determining deterioration and the like of a coating layer of an output mirror of a laser oscillator although it is not about an external optical system. The output mirror has a tendency to absorb a laser beam when deteriorating, to change the curvature in a thermally loaded state, and to concentrate parallel light due to so-called thermal lens effect. The laser machining device includes an aperture disposed behind the output mirror and a beam-power measurement sensor disposed behind the aperture, and when the beam power is greater than a reference value, determines deterioration of the output mirror.

Although not before laser machining, JP 2016-2580 A discloses a laser machining device capable of detecting a focal point shift of an external optical system due to thermal lens effect after machining. In a case where a focal point shift occurs due to thermal lens effect, the laser irradiation diameter increases, so that the laser machining device includes a reference measurement surface having a small opening and detects a focal point shift on the basis of the level of radiant light radiated from the periphery of the small opening.

SUMMARY OF THE INVENTION

The external optical system deteriorates over time. Consequently, loss of laser power occurs at the concentration point. Even with slight contamination, the focus position is moved, and thus the quality of laser machining deteriorates significantly. In this case, the optical component is required to be replaced or cleaned promptly. However, there is a problem that in a case where maintenance of the optical component is carried out after a defect in machining occurs, a large number of defective products are produced during automatic operation. On the other hand, there is a problem in a method in which a temperature sensor and a scattered light sensor are mounted in an external optical system that retrofitting cannot be carried out. Furthermore, not all external optical systems can be mounted with a sensor capable of detecting contamination, so that the freedom of choice by a user is reduced.

In addition, existing techniques cannot distinguish between a defect caused by a focus shift due to contamination of a lens and a defect caused by a change in transmittance due to contamination of a window. It is desirable that, by correcting the focus position in the case of only a focus shift, by changing a power condition in the case of a slight change in transmittance, and by adjusting both parameters in the case of simultaneous occurrence of a focus shift and a change in transmittance, automatic operation can continue even in the case where an optical system is contaminated, and the timing of cleaning or replacement of the optical system can be delayed.

Therefore, there is a need for a technique capable of adjusting a focus shift depending on the type and level of contamination of an external optical system before laser machining.

One aspect of the present disclosure provides a laser machining method executed by a laser machining device configured to perform laser machining to a workpiece after measuring an amount of focus movement due to contamination of an optical system to compensate a focus position, the laser machining method including, before laser machining: (a) issuing a command to emit a laser beam with a high power to the extent used for laser machining, toward a laser beam elimination part capable of eliminating the laser beam in order to warm up an external optical system configured to guide a laser beam from a laser oscillator to concentrate the laser beam on a surface of a workpiece; (b) after the external optical system is warmed up, issuing a command to adjust a focus position on a surface of a plate disposed in a position different from a position of the laser beam elimination part and having a small-diameter hole and a command to align an optical axis of the laser beam with a center of the small-diameter hole; (c) in a state where the external optical system is warmed up, issuing a command to emit a laser beam with a low power to the extent that the plate is not melted or deformed; (d) in a state where the external optical system is warmed up, measuring an amount of energy of the laser beam passing through the small-diameter hole as a first measurement value; (e) calculating an amount of focus movement on a basis of the first measurement value measured in a state where the external optical system is warmed up and a first reference value predetermined depending on a type of contamination of the external optical system in relation to the first measurement value; and (f) compensating a focus position in laser machining on a basis of the calculated amount of focus movement.

Another aspect of the present disclosure provides a laser machining method executed by a laser machining device configured to perform laser machining on a workpiece after measuring an amount of focus movement due to contamination of an optical system to compensate a focus position, the laser machining method including, before laser machining: (a) issuing a command to emit a laser beam with a high power to the extent used for laser machining, toward a laser beam elimination part capable of eliminating the laser beam in order to warm up an external optical system configured to guide a laser beam from a laser oscillator to concentrate the laser beam on a surface of a workpiece; (b) after the external optical system is warmed up, issuing a command to adjust a focus position on a surface of a plate disposed in a position different from a position of the laser beam elimination part and having a small-diameter hole and a command to align an optical axis of the laser beam with a center of the small-diameter hole; (c) in a state where the external optical system is warmed up, issuing a command to emit a laser beam with a low power to the extent that the plate is not melted or deformed; (d) in a state where the external optical system is warmed up, measuring an amount of energy of the laser beam passing through the small-diameter hole as a first measurement value; (g) issuing a command to move the focus position to a upward position and to a downward position from the surface of the plate; (h) issuing a command to emit a laser beam with the low power in a state where the focus position is adjusted to each of the upward position and the downward position; (i) measuring an amount of energy of the laser beam passing through the small-diameter hole as a third measurement value in a state where the focus position is adjusted to each of the upward position and the downward position; (j) generating a graph including the first measurement value measured in a state where the focus position is adjusted on the surface of the plate, and the third measurement value measured in a state where the focus position is adjusted to each of the upward position and the downward position, the graph being based on a type and level of contamination of the external optical system; (k) calculating a focus position from the graph and calculating an amount of focus movement on a basis of a difference between the calculated focus position and the focus position commanded to adjust on the surface of the plate; and (f) compensating a focus position in laser machining on a basis of the calculated amount of focus movement.

Yet another aspect of the present disclosure provides a laser machining method executed by a laser machining device configured to perform laser machining to a workpiece after measuring an amount of focus movement due to contamination of an optical system to compensate a focus position, the laser machining method including, before laser machining: (a) issuing a command to emit a laser beam with a high power to the extent used for laser machining toward a laser beam elimination part capable of eliminating the laser beam in order to warm up an external optical system configured to guide a laser beam from a laser oscillator to concentrate the laser beam on a surface of a workpiece; (b) after the external optical system is warmed up, issuing a command to adjust a focus position on a surface of a plate disposed in a position different from a position of the laser beam elimination part, having a small-diameter hole, and capable of absorbing a laser beam, and a command to align an optical axis of the laser beam with a center of the small-diameter hole; (c) in a state where the external optical system is warmed up, issuing a command to emit a laser beam with a low power to the extent that the plate is not melted or deformed; (d) in a state where the external optical system is warmed up, measuring an amount of energy of the laser beam passing through the small-diameter hole as a first measurement value; (s) in a state where the external optical system is warmed up, measuring an amount of energy of the laser beam absorbed by the plate as a second measurement value; (t) determining whether the external optical system is contaminated by comparing the first measurement value being the amount of energy of the laser beam passing through the small-diameter hole with a first reference value predetermined depending on a type of contamination of the external optical system; (u) determining contamination of only a window in the external optical system by comparing the second measurement value being the amount of energy of the laser beam absorbed by the plate with a second reference value predetermined depending on the type of contamination of the external optical system; (v) determining contamination of only a lens in the external optical system by comparing the first measurement value being the amount of energy of the laser beam passing through the small-diameter hole with a third reference value predetermined depending on the type of contamination of the external optical system and less than the first reference value; (w) in a case where only the lens in the external optical system is contaminated, calculating an amount of focus movement on a basis of the second measurement value being the amount of energy of the laser beam absorbed by the plate, a fourth reference value predetermined depending on a contamination level of the external optical system, and an amount of focus movement predetermined depending on the fourth reference value; and (f) compensating a focus position in laser machining on a basis of the calculated amount of focus movement.

BRIEF DESCRIPTION OF THE DRAWINGS

FIG. 6 is a diagram illustrating a database storing reference values predetermined depending on the types of contamination of the external optical system.

FIG. 7 is a diagram illustrating machining conditions in a normal state and machining conditions after compensation.

FIG. 14 is a diagram illustrating a database storing reference values predetermined depending on the types of contamination of the external optical system.

FIG. 15 is a diagram illustrating a database storing reference values predetermined depending on the contamination levels of the external optical system in relation to the amounts of energy of a laser beam absorbed by a plate and the amounts of focus movement correlated with the reference values.

DETAILED DESCRIPTION

Figure 1:
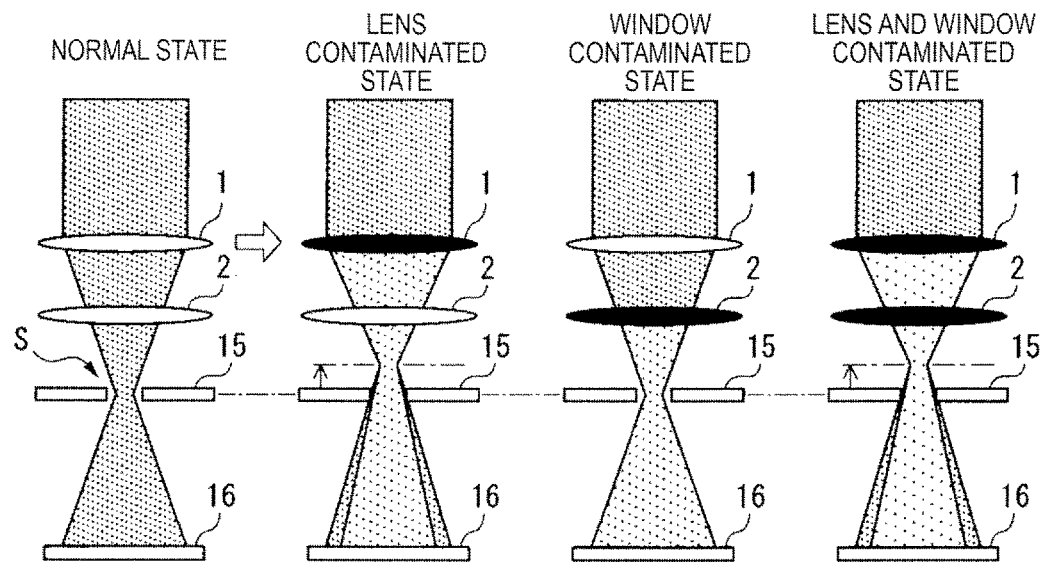
FIG. 1 is a schematic diagram for describing types of contamination of an external optical system.

Embodiments of the present disclosure will be described in detail below with reference to the accompanying drawings. Throughout the drawings, the same or similar components are denoted by the same or similar reference numerals. The embodiments described below should not be construed to limit the technical scope of the invention and meaning of terms set forth in the claims.

Definition of terms in the present specification will be described. The term "lens" in the present specification refers to an optical component including a surface having a curvature. In other words, "lens" used in the present specification refers to an optical component in which, when a laser beam is absorbed due to contamination, a change in curvature due to so-called thermal lens effect is large. The term "window" in the present specification refers to an optical component mainly composed of a flat surface. In other words, "window" used in the present specification refers to an optical component in which, when a laser beam is absorbed due to contamination, a change in curvature is small. The term "contamination" in the present specification refers to not only a state in which dust is merely accumulated but also a state in which accumulated dust is burnt by a laser beam to be stain in a dot pattern or such a deterioration state that a thin film disposed on a mirror or the like peels off and falls.

FIG. 1 is a schematic diagram for describing types of contamination of an external optical system. The external optical system includes, but not limited to, a lens 1 concentrating a laser beam on a workpiece surface and a window 2 disposed on the outermost side of the external optical system. When a laser beam is emitted from the external optical system while the focus position is adjusted on a surface of a plate 15 having a small-diameter hole S and the optical axis of the laser beam is aligned with the center of the small-diameter hole S, in a normal state with no contamination of the lens 1 and the window 2, the laser beam passes through the small-diameter hole S without being blocked by the plate 15 around the periphery of the small-diameter hole S. Thus, the amount of energy of the laser beam measured by an energy amount measuring unit 16 disposed below the plate 15 is maximum. In contrast, in a lens contaminated state in which only the lens 1 is contaminated, the focus position is moved to an upward position (or a downward position) due to thermal lens effect of the lens 1, and the laser beam is blocked by the plate 15 around the periphery of the small-diameter hole S, so that the amount of energy of the laser beam measured by the energy amount measuring unit 16 slightly decreases. Furthermore, in a window contaminated state in which only the window 2 is contaminated, no thermal lens effect is produced, and the focus position is not moved, so that the laser beam is not blocked by the plate 15 around the periphery of the small-diameter hole S. However, in a case where dust is accumulated thinly on a surface of the window 2, the window 2 absorbs the laser beam, so that the amount of energy measured by the energy amount measuring unit 16 decreases. In a case where dust is burnt to be stain in a dot pattern on the surface of the window 2, the window 2 scatters the laser beam, so that again, the amount of energy of the laser beam measured by the energy amount measuring unit 16 decreases. In addition, in a case where both of the lens 1 and the window 2 are contaminated, the focus position is moved due to thermal lens effect of the lens 1, and the laser beam is blocked by the plate 15 around the periphery of the small-diameter hole S, and in addition the window 2 absorbs or scatters the laser beam, so that the amount of energy of the laser beam measured by the energy amount measuring unit 16 is minimum.

Figure 2:
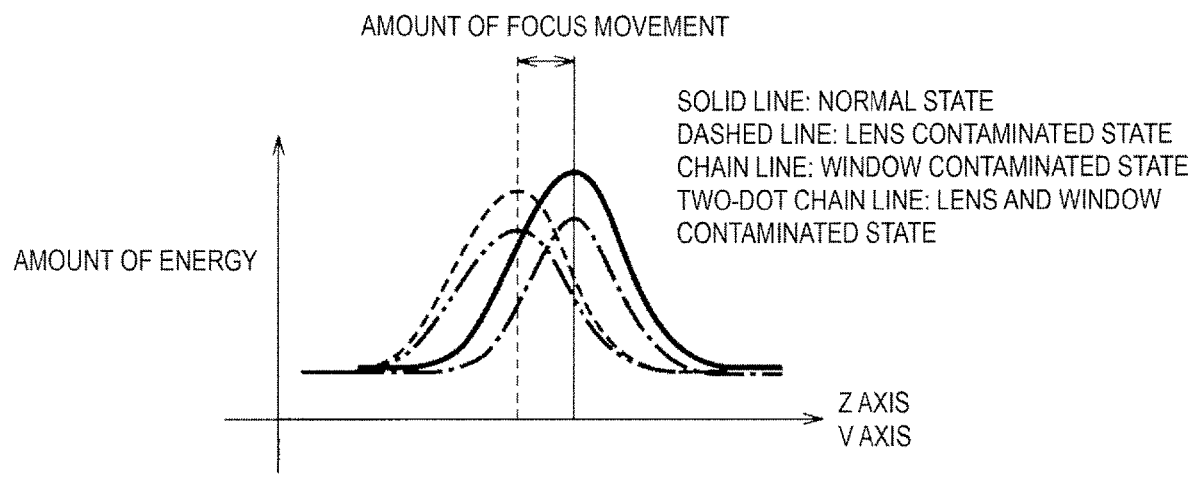
FIG. 2 is a graph illustrating a relationship between the amount of focus movement and the amount of energy of a laser beam passing through a small-diameter hole for each of the types of contamination.

FIG. 2 is a graph illustrating a relationship between the amount of focus movement and the amount of energy of a laser beam passing through the small-diameter hole for each of the types of contamination. As described above, in comparison with the normal state indicated by the solid line, in the lens contaminated state indicated by the dashed line, the focus position is moved, and the amount of energy of the laser beam passing through the small-diameter hole slightly decreases. In the window contaminated state indicated by the chain line, the focus position is not moved; however, the amount of energy of the laser beam passing through the small-diameter hole decreases. Furthermore, in the lens and window contaminated state indicated by the two-dot chain line, the focus position is moved, and the amount of energy of the laser beam passing through the small-diameter hole is minimum. In a case where the focus position is moved due to the contamination of the lens, the amount of energy of the laser beam absorbed by the plate around the periphery of the small-diameter hole increases. A laser machining device according to the present embodiment utilizes this physical phenomenon to distinguish between lens contamination and window contamination and to accurately adjust a focus shift on the basis of a reference value predetermined depending on the type of contamination of the external optical system or a graph based on the type and level of contamination of the external optical system.

Figure 3:
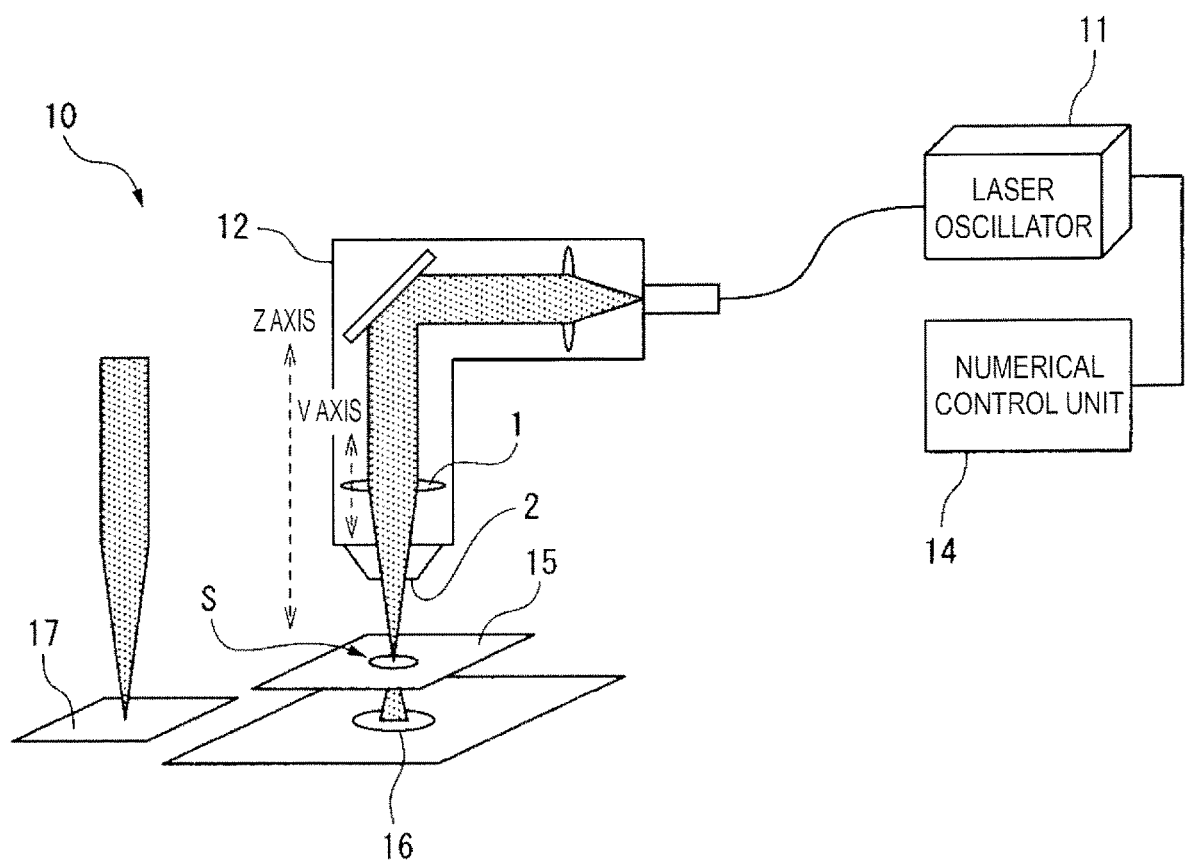
FIG. 3 is a simplified diagram illustrating a simplified configuration of a laser machining device according to one embodiment.

FIG. 3 is a simplified diagram illustrating a simplified configuration of a laser machining device 10 according to the present embodiment. The laser machining device 10 includes a laser oscillator 11, an external optical system 12 guiding a laser beam from the laser oscillator 11 to concentrate the beam on a surface of a workpiece, and a numerical control unit 14 controlling the entire laser machining device 10. The laser machining device 10 further includes a plate 15 disposed outside a machining table and having, for example, a 0.5-mm small-diameter hole S, an energy amount measuring unit 16 measuring the amount of energy of the laser beam passing through the small-diameter hole S, and a laser beam elimination part 17 disposed in a position different from the position of the plate 15 and capable of eliminating the laser beam. The energy amount measuring unit 16 may be a thermocouple or a thermopile measuring the amount of heat of the laser beam passing through the small-diameter hole S, or a power sensor measuring power of the laser beam passing through the small-diameter hole S. The laser beam elimination part 17 may be an anodized aluminum plate or an optical system, such as a mirror, reflecting the laser beam off to another place.

Figure 4:
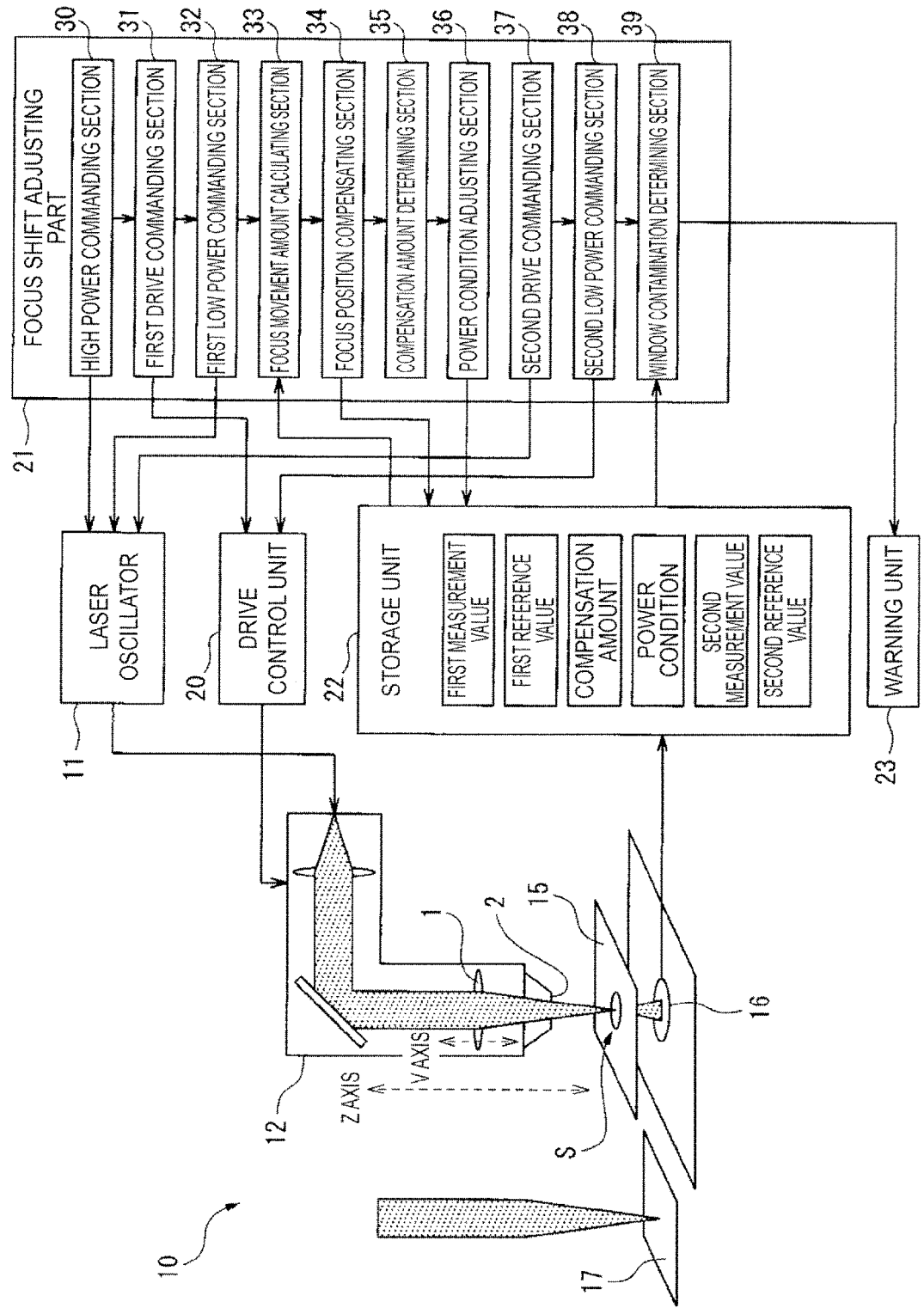
FIG. 4 is a block diagram illustrating a configuration of the laser machining device according to the one embodiment.

FIG. 4 is a block diagram illustrating a configuration of the laser machining device 10 according to the present embodiment. The laser machining device 10 further includes a drive control unit 20 moving the focus position and optical axis of the laser beam emitted from the external optical system 12, a focus shift adjusting part 21 configured by a semiconductor integrated circuit, such as an ASIC and an FPGA, or a computer-executable program and adjusting a focus shift before laser machining, and a storage unit 22 storing various pieces of data. The focus shift adjusting part 21 includes a high power commanding section 30 that commands the laser oscillator 11 to emit a laser beam with a high power (e.g., 3500 W) to the extent used for laser machining, toward the laser beam elimination part 17 in order to warm up the external optical system 12, a first drive commanding section 31 that, after the external optical system 12 is warmed up, commands the drive control unit 20 to adjust the focus position on a surface of the plate 15 and to align the optical axis of the laser beam with the center of the small-diameter hole S, and a first low power commanding section 32 that, in a state where the external optical system 12 is warmed up, commands the laser oscillator 11 to emit a laser beam with a low power (e.g., 50 W) to the extent that the plate 15 is not melted or deformed. The focus shift adjusting part 21 further includes a focus movement amount calculating section 33 calculating the amount of focus movement on the basis of a first measurement value measured by the energy amount measuring unit 16 in a state where the external optical system 12 is warmed up and a first reference value (e.g., 50 W in the normal state, 40 W in the window contaminated state, 35 W in the lens contaminated state, 30 W in the lens and window contaminated state) predetermined depending on the type of contamination of the external optical system 12 in relation to the first measurement value.

FIG. 6 is a drawing illustrating a database D1 storing reference values predetermined depending on the types of contamination of the external optical system 12. The database D1 contains the first reference values for the normal state (with no contamination), the window contaminated state, the lens contaminated state, and the lens and window contaminated state. The first reference value may be an amount of energy being any one of a voltage value, a temperature, power, and the like. When the first measurement value measured in a state where the external optical system 12 is warmed up is 36 W, for example, the first measurement value is closest to the first reference value (35 W) for the lens contaminated state, and thus the focus movement amount calculating section 33 uses the graph for the lens contaminated state illustrated in FIG. 2 to calculate the focus position (e.g., 2 mm) and takes the difference between the calculated focus position (e.g., 2 mm) and the focus position (e.g., 1 mm) adjusted on the surface of the plate 15 through the command to calculate the amount of focus movement (e.g., +1 mm). With reference to FIG. 4 again, the focus shift adjusting part 21 further includes a focus position compensating section 34 compensating the focus position in laser machining on the basis of the calculated amount of focus movement (e.g., +1 mm). In a case where the focus position in laser machining is at a distance of 1 mm, for example, the focus position compensating section 34 compensates the focus position in laser machining by subtracting the amount of focus movement, +1 mm, so that the focus position is at a distance of 0 mm.

FIG. 7 is a diagram illustrating machining conditions in the normal state and machining conditions (1) to (3) after compensation. These machining conditions are stored in the storage unit 22 illustrated in FIG. 4, which is not illustrated. The machining conditions (1) are for the case in which the above-described focus position compensating section 34 compensates the focus position in laser machining at a distance of 1 mm so that the focus position is at a distance of 0 mm. The machining conditions (2) are for the case in which a power condition of 3000 W is adjusted so as to be 3500 W, which will be described later. The machining conditions (3) are for the case in which the focus position and power condition are adjusted so as to be 0 mm and 3500 W, which will be described later.

With reference to FIG. 4 again, the focus shift adjusting part 21 further includes, as an optional component, a compensation amount determining section 35 that, after the focus position is compensated, repeats the processes from when the external optical system 12 is warmed up until when the focus position is compensated to determine whether the compensation amount is correct. With this repeating, the compensation amount becomes closer and closer to 0, so that whether the compensation amount is correct can be determined. The focus shift adjusting part 21 further includes, as an optional component, a power condition adjusting section 36 that, in a case where the compensation amount does not become closer to 0 even with the repeating, increases a power condition in laser machining. In the case where the compensation amount does not become closer to 0 even with the repeating, the window, in addition to the lens, is highly likely to be contaminated. Thus, the power condition adjusting section 36 increases the power condition in laser machining to make the compensation amount closer to 0. The machining conditions (3) after the focus position at a distance of 1 mm is compensated so as to be at a distance of 0 mm and a power condition of 3000 W in laser machining is adjusted so as to be 3500 W are illustrated in FIG. 7 as described above.

With reference to FIG. 4 again, the focus shift adjusting part 21 further includes, as an optional component, a configuration determining contamination of only the window 2. In specific, the focus shift adjusting part 21 includes a second drive commanding section 37 that, before the external optical system 12 is warmed up, commands the drive control unit 20 to adjust the focus position on the surface of the plate 15 having the small-diameter hole S and to align the optical axis of the laser beam with the center of the small-diameter hole S, a second low power commanding section 38 that, before the external optical system 12 is warmed up, commands the laser oscillator 11 to emit a laser beam with a low power (e.g., 50 W) to the extent the plate 15 is not melted or deformed, and a window contamination determining section 39 that determines contamination of the window 2 in the external optical system 12 on the basis of a second measurement value measured in a state where the external optical system 12 is not warmed up and a second reference value predetermined depending on the contamination type of the external optical system. The focus shift adjusting part 21 may further include a warning unit 23 that, in a case where the window 2 of the external optical system 12 is determined as being contaminated, issues a warning message. The warning unit 23 may be a warning lamp or a monitor displaying the warning message on an operation panel. The above-described first measurement value, first reference value, compensation amount, power condition, second measurement value, and second reference value are stored in the storage unit 22.

Figure 5:
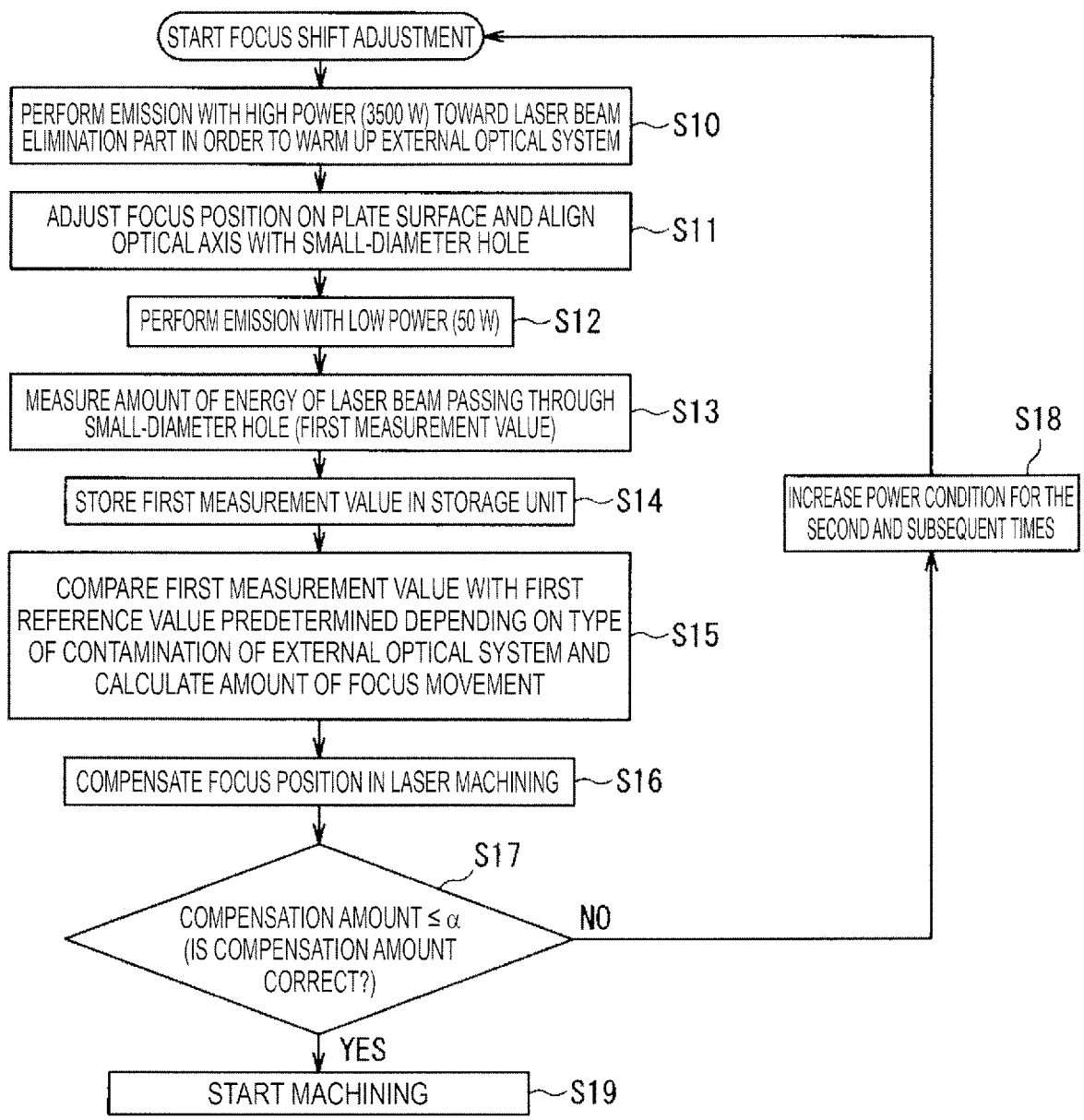
FIG. 5 is a flowchart illustrating operations of the laser machining device according to the one embodiment.

FIG. 5 is a flowchart illustrating operations of the laser machining device 10 according to the present embodiment. Focus shift adjusting processes will be described below with reference to FIGS. 4 and 5. The focus shift adjusting part 21 starts focus shift adjustment before laser machining. In Step S10, the high power commanding section 30 commands the laser oscillator 11 to emit a laser beam with a high power (e.g., 3500 W) to the extent used for laser machining toward the laser beam elimination part 17 in order to warm up the external optical system 12. In Step S11, after the external optical system 12 is warmed up, the first drive commanding section 31 commands the drive control unit 20 to adjust the focus position on the surface of the plate 15 and to align the optical axis of the laser beam with the center of the small-diameter hole S. In Step S12, in a state where the external optical system 12 is warmed up, the first low power commanding section 32 commands the laser oscillator 11 to emit a laser beam with a low power (e.g., 50 W) to the extent that the plate 15 is not melted or deformed. In Step S13, in a state where the external optical system 12 is warmed up, the energy amount measuring unit 16 measures the amount of energy of the laser beam passing through the small-diameter hole S as a first measurement value (e.g., 36 W). In Step S14, the storage unit 22 stores the first measurement value.

In Step S15, the focus movement amount calculating section 33 calculates the amount of focus movement (e.g., +1 mm) on the basis of the first measurement value (e.g., 36 W) measured by the energy amount measuring unit 16 in a state where the external optical system 12 is warmed up and the first reference value (e.g., 50 W in the normal state, 40 W in the window contaminated state, 35 W in the lens contaminated state, 30 W in the lens and window contaminated state) predetermined depending on the type of contamination of the external optical system 12 in relation to the first measurement value. In Step S16, the focus position compensating section 34 compensates the focus position (e.g., 1 mm) in laser machining on the basis of the calculated amount of focus movement (e.g., +1 mm) (e.g., 0 mm). In Steps S17 and S18, which are optional steps, the compensation amount determining section 35 repeats the processes from Step S10 of warming up the external optical system to Step S16 of compensating the focus position to determine whether the compensation amount is correct (i.e., whether the compensation amount becomes closer to 0). If the compensation amount exceeds an allowable value α (α is a value closer to 0, e.g., 0.1) (NO in Step S17), the compensation amount does not become closer to 0 yet, so that Step S10 of warming up the external optical system to Step S16 of compensating the focus position are repeated. In a case where this repeating is performed twice or more, there is a possibility that not only the lens is contaminated but also the window is contaminated, so that in Step S18, the power condition adjusting section 36 may increase the power condition (e.g., adjustment from 50 W to 55 W). At this time, the power condition adjusting section 36 increases the power condition in laser machining with almost the same ratio (e.g., adjustment from 3000 W to 3500 W). In Step S17, if the compensation amount is equal to or less than the allowable value α (e.g., 0.1) (NO in Step S17), the compensation amount is correct, so that in Step S19, the laser machining device 10 starts laser machining. This laser machining device 10 can automatically adjust a focus shift depending on the type and level of contamination of the external optical system 12 before laser machining. Thus, automatic operation can continue even in the case where the external optical system 12 is contaminated, and the timing of cleaning or replacement of the external optical system 12 can be delayed.

Figure 8:
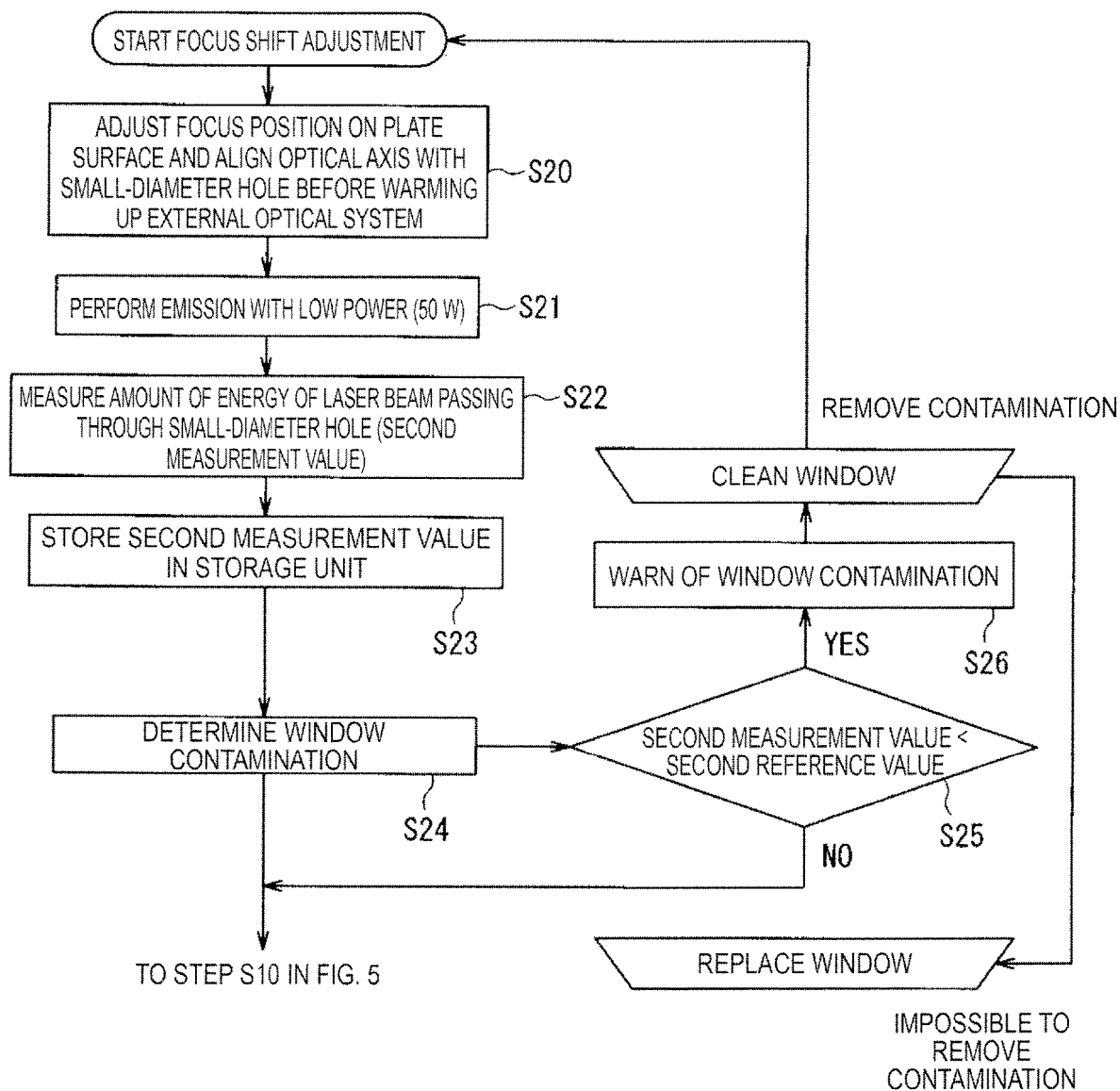
FIG. 8 is a flowchart illustrating window contamination detecting processes according to the one embodiment.

FIG. 8 is a flowchart illustrating window contamination detecting processes according to the present embodiment. The window contamination detecting processes will be described with reference to FIGS. 4 and 8. The window contamination detecting processes are carried out before the external optical system 12 is warmed up to prevent the focus position from being moved due to thermal lens effect caused by contamination of the lens 1. Thus, after the window contamination detecting processes, the procedure returns to Step S10 in FIG. 5 to carry out the lens contamination detecting processes. In this way, distinction between window contamination and lens contamination or isolation of one of window contamination and lens contamination from the other is more accurate. In Step S20, before the external optical system 12 is warmed up, the second drive commanding section 37 commands the drive control unit 20 to adjust the focus position on the surface of the plate 15 having the small-diameter hole S and to align the optical axis of the laser beam with the center of the small-diameter hole S. In Step S21, before the external optical system 12 is warmed up, the second low power commanding section 38 commands the laser oscillator 11 to emit a laser beam with a low power (e.g., 50 W) to the extent that the plate 15 is not melted or deformed. In Step S22, in a state where the external optical system is not warmed up, the energy amount measuring unit 16 measures the amount of energy of the laser beam passing through the small-diameter hole S as a second measurement value. In Step S23, the storage unit 22 stores the second measurement value. In Step S24, the window contamination determining section 39 starts determination of contamination of the window 2. In Step S25, the window contamination determining section 39 compares the second measurement value (e.g., 43 W) measured in a state where the external optical system is not warmed up with the second reference value (e.g., 40 W) predetermined depending on the type of contamination of the external optical system, and if the second measurement value is less than the second reference value (YES in Step S25), the amount of energy of the laser beam passing through the small-diameter hole S is decreased with no change in the focus position due to thermal lens effect, so that the window 2 is determined as being contaminated. Thus, in Step S26, the warning unit 23 issues a warning message about contamination of the window 2 to prompt an operator to clean the window 2. In a case where contamination on the window 2 is removed, the procedure returns to Step S20, and the window contamination detecting processes are repeated. In a case where contamination on the window 2 cannot be removed, the operator replaces the window 2. Note that instead of the warning unit 23 issuing the warning message about contamination of the window 2 in Step S26 to prompt maintenance of the window, the power condition adjusting section 36 may increase the power condition (e.g., adjustment from 50 W to 55 W), and the procedure may return to Step S20 to continue the window contamination detecting processes again. At this time, the power condition adjusting section 36 increases the power condition in laser machining with almost the same ratio (e.g., adjustment from 3000 W to 3500 W). The machining conditions (2) after only a power condition of 3000 W in laser machining is compensated so as to be 3500 W are illustrated in FIG. 7 mentioned above. This laser machining device 10 can more accurately distinguish between window contamination and lens contamination or isolate one of window contamination and lens contamination from the other, and can thus more accurately adjust a focus shift due to lens contamination.

Figure 9:
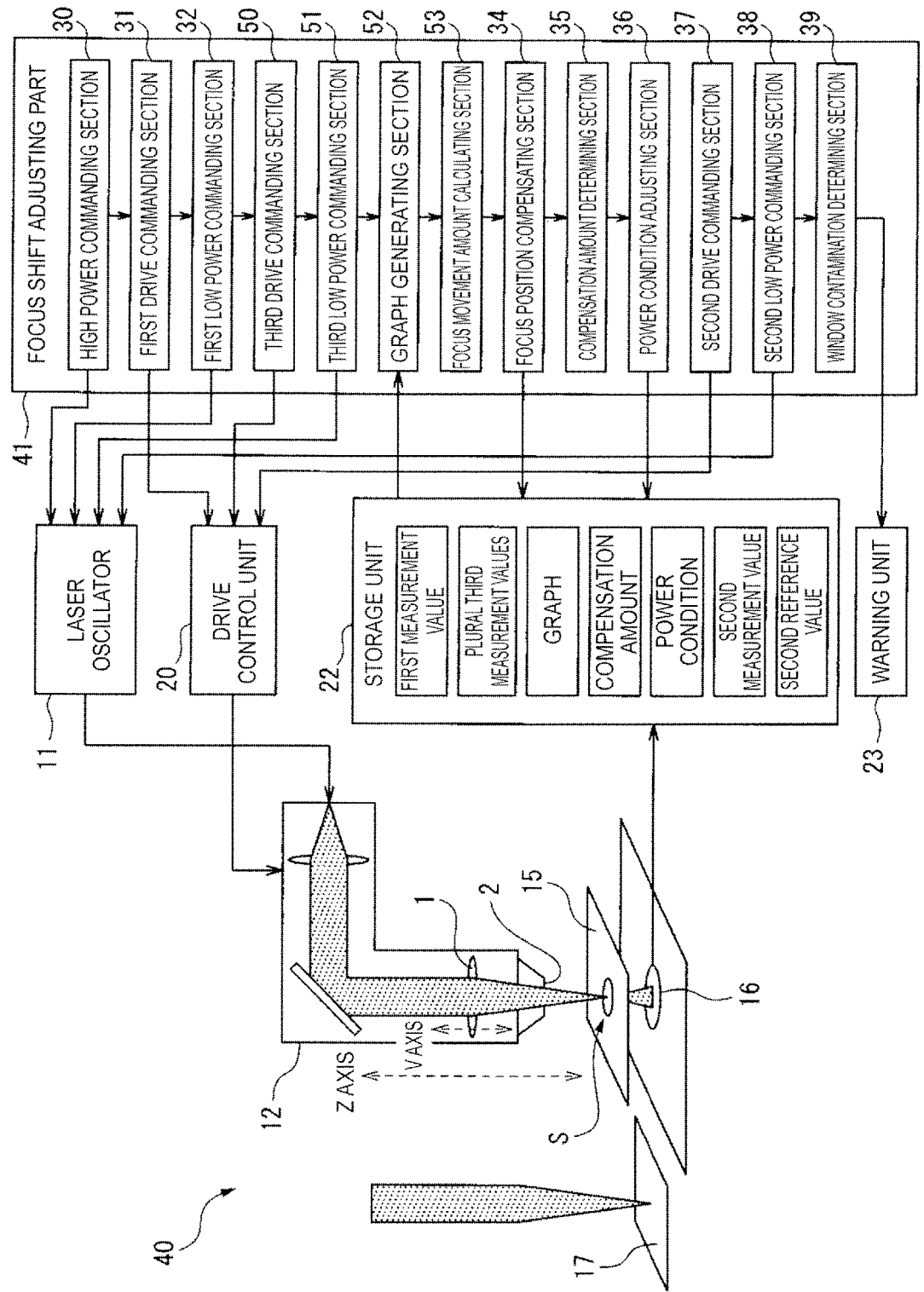
FIG. 9 is a block diagram illustrating a configuration of a laser machining device according to another embodiment.

FIG. 9 is a simplified diagram illustrating a simplified configuration of a laser machining device 40 according to another embodiment. The laser machining device 40 has a configuration different from that of the laser machining device 10 described with reference to FIG. 4, in that not only the focus position is adjusted on the surface of the plate 15 and the amount of energy of the laser beam passing through the small-diameter hole S is measured as the first measurement value, but also the focus position is adjusted to each of a upward position and a downward position from the surface of the plate 15, the amount of energy of the laser beam passing through the small-diameter hole S is measured as a third measurement value a plurality of times, and a graph including the first measurement value and the third measurement values and based on the type and level of contamination of the external optical system is generated to calculate the amount of focus movement from the graph. The configuration different from that of the laser machining device 10 will be described below. The laser machining device 40 includes a focus shift adjusting part 41 configured by a semiconductor integrated circuit, such as an ASIC and an FPGA, or a computer-executable program and adjusting a focus shift before laser machining. The focus shift adjusting part 41 includes a third drive commanding section 50 that issues a command to move the focus position to a upward position and a downward position from the surface of the plate 15, a third low power commanding section 51 that, in a state where the focus position is adjusted to each of the upward position and the downward position, issues a command to emit a laser beam with a low power (e.g., 50 W) to the extent that the plate is not melted or deformed, a graph generating section 52 that generates a graph including the first measurement value measured in a state where the focus position is adjusted on the surface of the plate 15 and a plurality of third measurement values measured in a state where the focus position is adjusted to each of the upward position and the downward position and depending on the type and level of contamination of the external optical system, and a focus movement amount calculating section 53 that calculates the focus position from the graph and calculates the amount of focus movement on the basis of the difference between the calculated focus position and the focus position commanded to adjust on the surface of the plate 15. The third measurement values and graph are stored in the storage unit 22. The other configuration is the same as that of the laser machining device 10.

Figure 10:
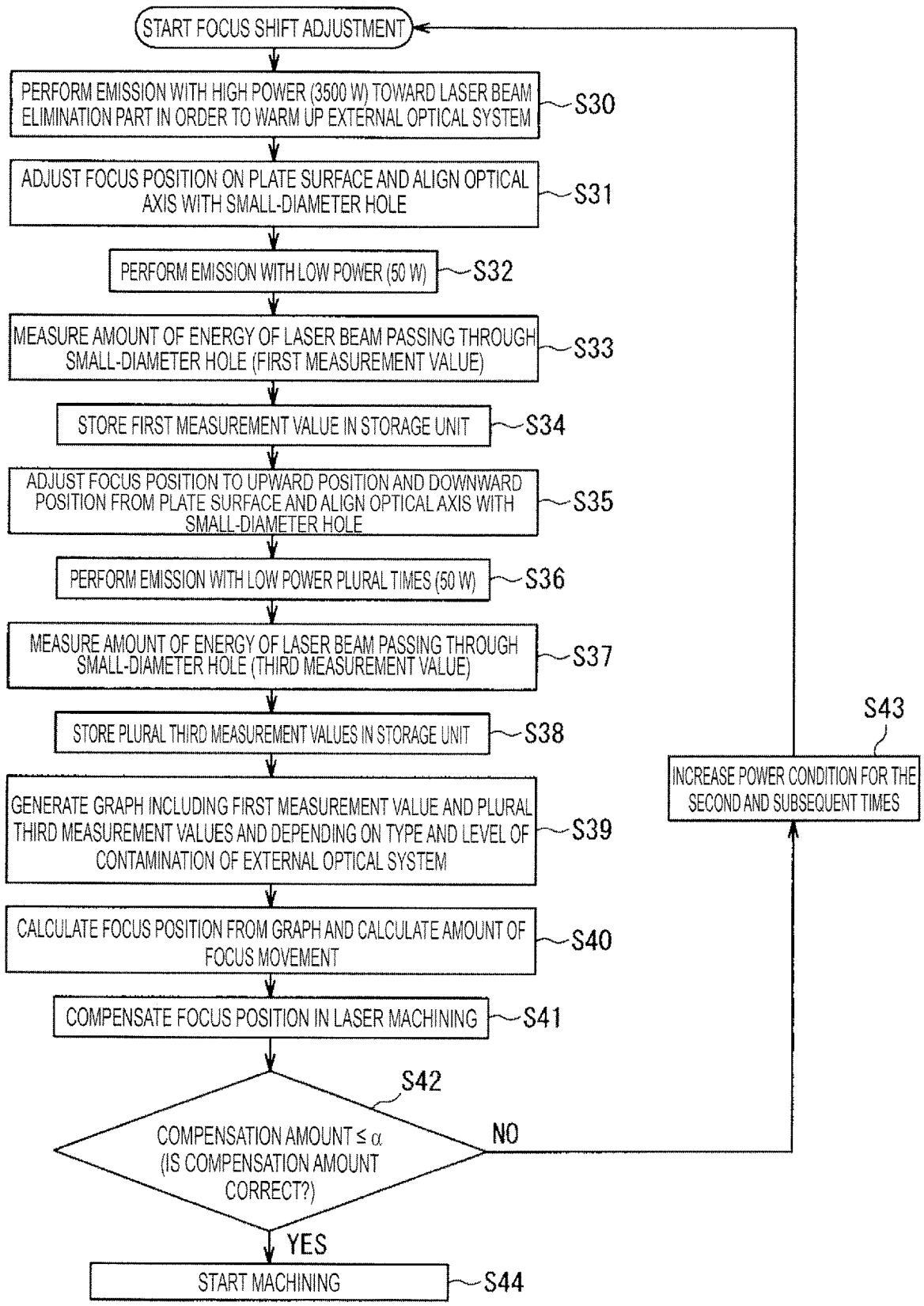
FIG. 10 is a flowchart illustrating operations of the laser machining device according to the another embodiment.

FIG. 10 is a flowchart illustrating operations of the laser machining device 40 according to the other embodiment. Focus shift adjusting processes will be described below with reference to FIGS. 9 and 10. The focus shift adjusting part 41 starts focus shift adjusting processes before laser machining. The processes from Step S30 to Step S34 are the same as the processes from Step S10 to Step S14 at the focus shift adjusting part 21 described with reference to FIG. 5. In Step S35, in a state where the external optical system 12 is warmed up, the third drive commanding section 50 issues a command to move the focus position to an upward position and a downward position from the surface of the plate 15. In Step S36, in a state where the focus position is adjusted to each of the upward position and the downward position, the third low power commanding section 51 issues a command to emit a laser beam with a low power (e.g., 50 W) to the extent that the plate 15 is not melted or deformed. In Step S37, in a state where the focus position is adjusted to each of the upward position and the downward position, the energy amount measuring unit 16 measures the amounts of energy of the laser beams passing through the small-diameter hole S as third measurement values. In Step S38, the storage unit 22 stores the third measurement values. In Step S39, the graph generating section 52 generates a graph including the first measurement value measured in a state where the focus position is adjusted on the surface of the plate 15 and the third measurement values measured in a state where the focus position is adjusted to each of the upward position and the downward position from the surface of the plate 15 and depending on the type and level of contamination of the external optical system. In Step S40, the focus movement amount calculating section 53 calculates the focus position from the graph and calculates the amount of focus movement on the basis of the difference between the calculated focus position and the focus position commanded to adjust on the surface of the plate 15. The processes from Step S41 to Step S44 are the same as the processes from Step S16 to Step S19 described with reference to FIG. 5. This laser machining device 40 can more accurately calculate the focus position on the basis of the graph and can thus more accurately adjust a focus shift. Thus, automatic operation can continue even in the case where the external optical system 12 is contaminated, and the timing of cleaning or replacement of the external optical system 12 can be delayed.

Figure 11:
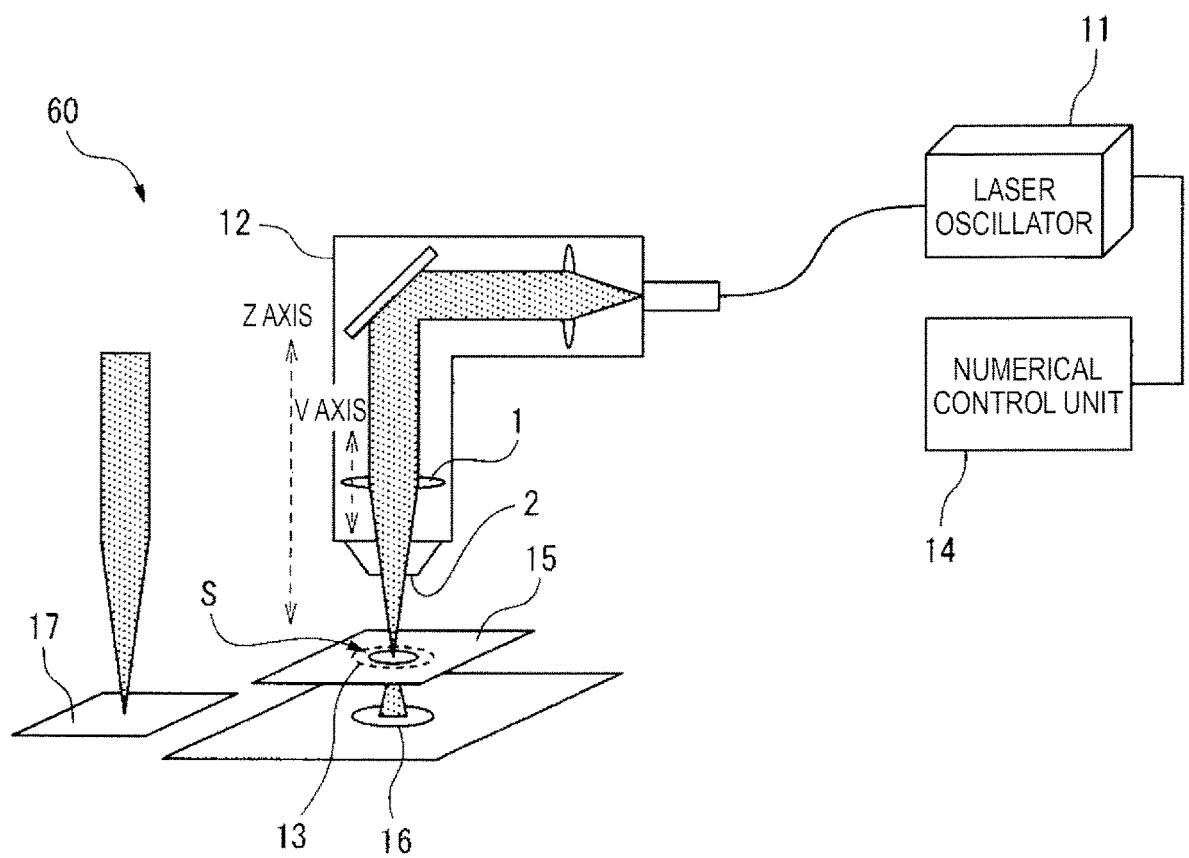
FIG. 11 is a simplified diagram illustrating a simplified configuration of a laser machining device according to yet another embodiment.

FIG. 11 is a simplified diagram illustrating a simplified configuration of a laser machining device 60 according to yet another embodiment. The laser machining device 60 includes a first energy amount measuring unit 16 measuring the amount of energy of a laser beam passing through the small-diameter hole S as a first measurement value and a second energy amount measuring unit 13 disposed around the periphery of the small-diameter hole S on the bottom surface of the plate 15 and measuring the amount of energy of a laser beam absorbed by the plate 15 as a second measurement value, and has a configuration different from those of the laser machining devices 10, 40 described with reference to FIGS. 4 and 9 in that window contamination and lens contamination are distinguished minutely on the basis of the first measurement value and the second measurement value. The second energy amount measuring unit 13 may be a thermocouple or a thermopile measuring the amount of heat of the laser beam absorbed by the plate 15, or a power sensor measuring power of the laser beam absorbed by the plate 15. The laser machining device 60 may further include a shield (not illustrated) disposed between the plate 15 and the first energy amount measuring unit 16 and shielding reflected light or radiant heat directed toward the plate 15. The configuration different from those of the laser machining devices 10, 40 will be described below.

Figure 12:
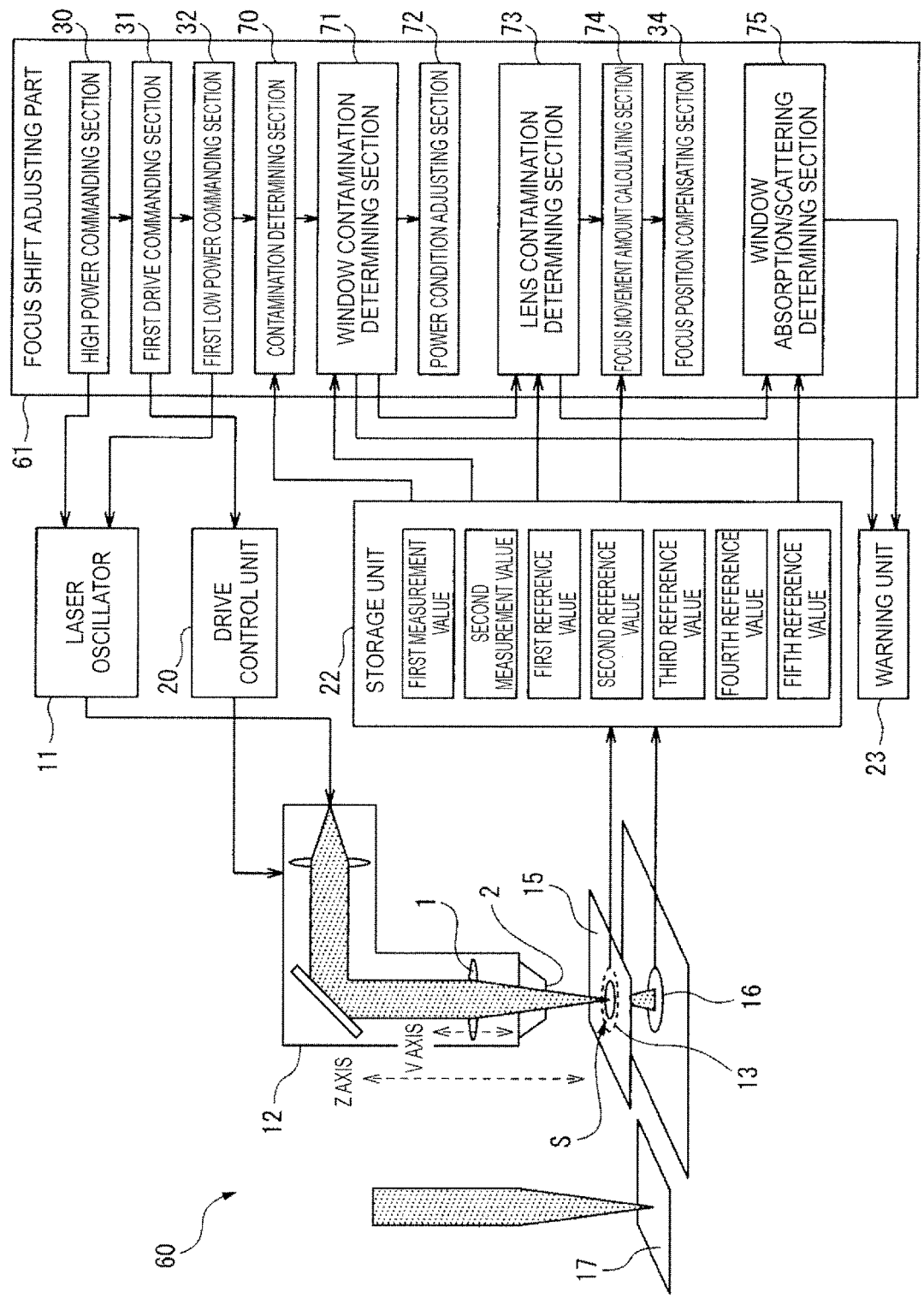
FIG. 12 is a block diagram illustrating a configuration of the laser machining device according to the yet another embodiment.

FIG. 12 is a block diagram illustrating a configuration of the laser machining device 60 according to the yet another embodiment. The laser machining device 60 includes a focus shift adjusting part 61 configured by a semiconductor integrated circuit, such as an ASIC and an FPGA, or a computer-executable program and adjusting a focus shift before laser machining. The focus shift adjusting part 61 further includes a contamination determining section 70 that determines whether the external optical system is contaminated by comparing the first measurement value being the amount of energy of the laser beam passing through the small-diameter hole S with the first reference value (e.g., 45 W) predetermined depending on the type of contamination of the external optical system 12. The focus shift adjusting part 61 further includes a window contamination determining section 71 that determines contamination of only the window 2 in the external optical system by comparing the second measurement value being the amount of energy of the laser beam absorbed by the plate 15 with the second reference value (e.g., 5 W) predetermined depending on the type of contamination of the external optical system 12, and a power condition adjusting section 72 that, in a case where contamination of the window 2 is slight, increases the power condition. The focus shift adjusting part 61 further includes a lens contamination determining section 73 that compares the first measurement value being the amount of energy of the laser beam passing through the small-diameter hole S with a third reference value (e.g., 42 W) predetermined depending on the type of contamination of the external optical system 12 and less than the first reference value to determine contamination of only the lens 1 in the external optical system 12, and a focus movement amount calculating section 74 that, in a case where only the lens 1 is determined as being contaminated, calculates the amount of focus movement on the basis of the second measurement value being the amount of energy of the laser beam absorbed by the plate 15, a fourth reference value (e.g., 1 W to 8 W) predetermined depending on the contamination level of the external optical system 12, and an amount of focus movement (e.g., 0.3 mm to 12 mm) predetermined depending on the fourth reference value. The focus shift adjusting part 61 further includes a window absorption/scattering determining section 75 that determines absorption or scattering of the laser beam due to contamination of the window 2 by comparing the second measurement value being the amount of energy of the laser beam absorbed by the plate 15 with a fifth reference value (e.g., 7 W) predetermined depending on the type of contamination of the external optical system 12 and greater than the second reference value (e.g., 5 W). The first measurement value, second measurement value, and first reference value to fifth reference value are stored in the storage unit 22.

FIG. 14 is a diagram illustrating a database D2 storing reference values predetermined depending on the types of contamination of the external optical system. The database D2 contains the first reference value (e.g., 45 W) for determining whether the external optical system is contaminated, that relates to the amount of energy of the laser beam passing through the small-diameter hole S, and the third reference value (e.g., 42 W) for determining contamination of only the lens 1. The database D2 also contains the second reference value (e.g., 5 W) for determining contamination of only the window 2, that relates to the amount of energy of the laser beam absorbed by the plate 15, and the fifth reference value (e.g., 7 W) for determining absorption or scattering of the laser beam due to contamination of the window 2.

FIG. 15 is a diagram illustrating a database D3 storing the predetermined reference values relating to the amounts of energy of the laser beam absorbed by the plate and the amounts of focus movement correlated with the reference values. The database D3 contains the fourth reference values (e.g., 1 W to 8 W) predetermined depending on the contamination levels of the external optical system 12 and the amounts of focus movement (e.g., 0.3 mm to 12 mm) predetermined depending on the fourth reference values.

Figure 13:
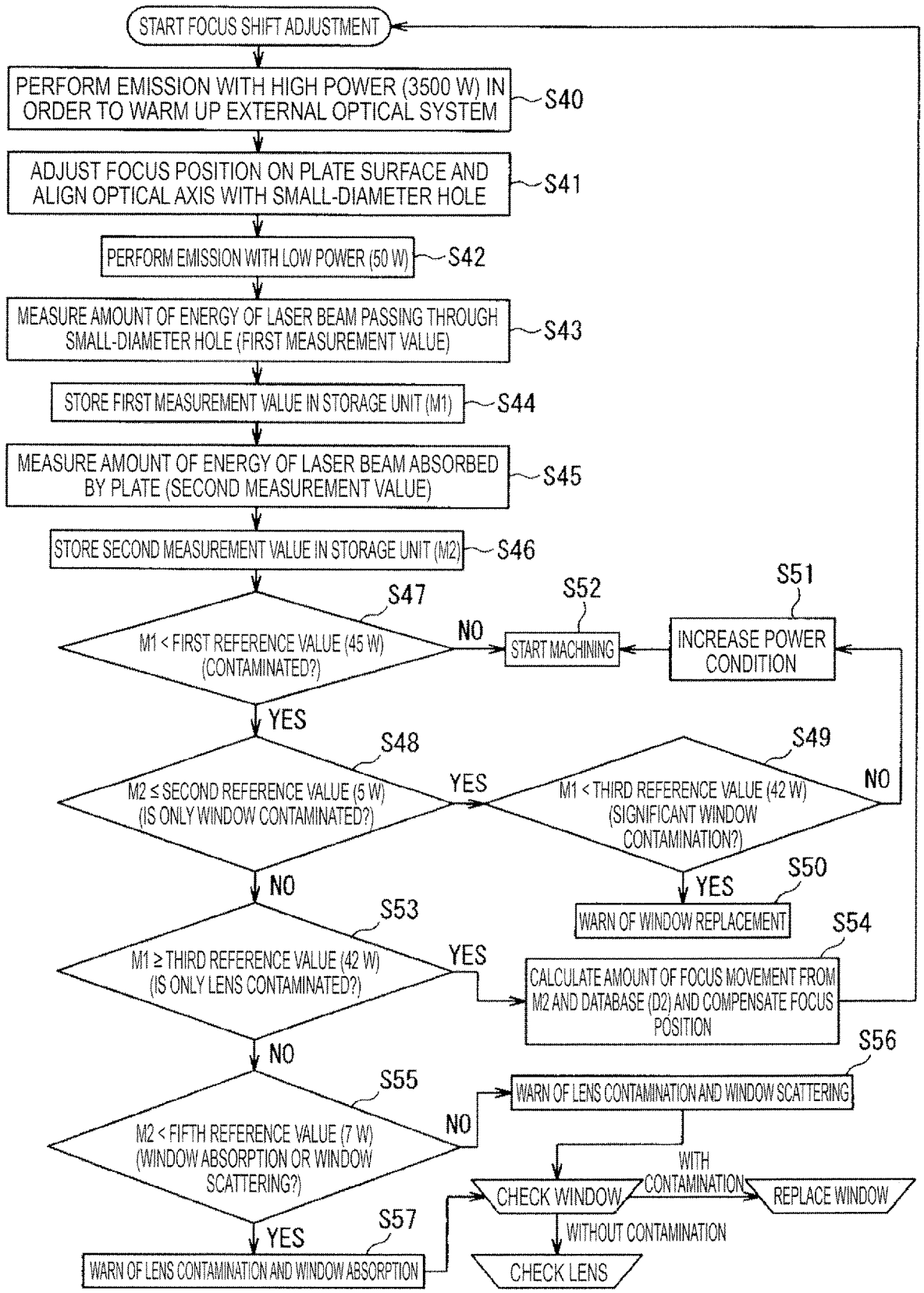
FIG. 13 is a flowchart illustrating operations of the laser machining device according to the yet another embodiment.

FIG. 13 is a flowchart illustrating operations of the laser machining device 60 according to the yet another embodiment. Focus shift adjusting processes will be described below with reference to FIGS. 12 and 13. The focus shift adjusting part 61 starts focus shift adjustment before laser machining. The processes of Step S40 and Step S41 are the same as the processes of Step S10 and Step S11 at the focus shift adjusting part 21 described with reference to FIG. 5. In Step S42, the first energy amount measuring unit 16 measures the amount of energy of the laser beam absorbed by the plate 15 as a first measurement value. In Step S43, the storage unit 22 stores the first measurement value (M1). In Step S45, the second energy amount measuring unit 13 measures the amount of energy of the laser beam absorbed by the plate 15 as a second measurement value. In Step S46, the storage unit 22 stores the second measurement value (M2).

In Step S47, the contamination determining section 70 determines whether the external optical system is contaminated by comparing the first measurement value (M1) being the amount of energy of the laser beam passing through the small-diameter hole S with the first reference value (e.g., 45 W) predetermined depending on the type of contamination of the external optical system 12. In Step S47, if the first measurement value (M1) being the amount of energy of the laser beam passing through the small-diameter hole S is equal to or greater than the first reference value (e.g., 45 W) (NO in Step S47), the external optical system is determined as being uncontaminated, and in Step S52, the laser machining device 60 starts laser machining without compensation of the focus position. In Step S47, if the first measurement value (M1) being the amount of energy of the laser beam passing through the small-diameter hole S is less than the first reference value (e.g., 45 W) (YES in Step S47), the external optical system is determined as being contaminated, and the procedure proceeds to Step S48.

In Step S48, the window contamination determining section 71 determines contamination of only the window 2 in the external optical system by comparing the second measurement value (M2) being the amount of energy of the laser beam absorbed by the plate 15 with the second reference value (e.g., 5 W) predetermined depending on the type of contamination of the external optical system 12. In Step S48, if the second measurement value (M2) being the amount of energy of the laser beam absorbed by the plate 15 is equal to or less than the second reference value (e.g., 5 W) (YES in Step S48), only the window 2 is determined as being contaminated, and the procedure proceeds to Step S49. In Step S49, a window contamination degree determining section (not illustrated) determines the degree of contamination of the window 2 in the external optical system by comparing the first measurement value (M1) being the amount of energy of the laser beam passing through the small-diameter hole S with the third reference value (e.g., 42 W) predetermined depending on the type of contamination of the external optical system 12 and less than the first reference value. Note that the window contamination degree determining section is an optional component. In Step S49, if the first measurement value (M1) being the amount of energy of the laser beam passing through the small-diameter hole S is less than the third reference value (e.g., 42 W) (YES in Step S49), the window is determined as being significantly contaminated, and in Step S50, the warning unit 23 issues a warning message about window replacement. In Step S49, if the first measurement value (M1) being the amount of energy of the laser beam passing through the small-diameter hole S is equal to or greater than the third reference value (e.g., 42 W) (NO in Step S49), the window is determined as being slightly contaminated, and in Step S51, the power condition adjusting section 72 increases the power condition in laser machining. Then, in Step S52, the laser machining device 60 starts laser machining with the adjusted power condition.

In Step S48, if the second measurement value (M2) being the amount of energy of the laser beam absorbed by the plate 15 is greater than the second reference value (e.g., 5 W) (YES in Step S48), the lens 1 is determined as being contaminated, and the procedure proceeds to Step S53. In Step S53, the lens contamination determining section 73 determines contamination of only the lens 1 in the external optical system 12 by comparing the first measurement value (M1) being the amount of energy of the laser beam passing through the small-diameter hole S with the third reference value (e.g., 42 W) predetermined depending on the type of contamination of the external optical system 12 and less than the first reference value. In Step S53, if the first measurement value (M1) being the amount of energy of the laser beam passing through the small-diameter hole S is equal to or greater than the third reference value (e.g., 42 W) (YES in Step S53), only the lens 1 is determined as being contaminated, and the procedure proceeds to Step S54 of adjusting the focus position. In Step S54, the focus movement amount calculating section 74 calculates the amount of focus movement (e.g., +1 mm) on the basis of the second measurement value (M2) being the amount of energy of the laser beam absorbed by the plate 15, the fourth reference value (e.g., 1 W to 8 W) predetermined depending on the contamination level of the external optical system 12, and the amount of focus movement (e.g., 0.3 mm to 12 mm) predetermined depending on the fourth reference value, and the focus position compensating section 34 compensates the focus position (e.g., 1 mm) in laser machining on the basis of the calculated amount of focus movement (e.g., +1 mm) (e.g., 0 mm). Subsequently, the procedure returns to Step S40 of warming up the external optical system 12, and the focus shift adjusting part 61 repeats the focus shift adjusting processes. Then, if the compensation amount is correct, the external optical system 12 is determined as being uncontaminated in Step S47 (NO in Step S47), and the laser machining device 60 starts laser machining on the basis of the compensated focus position.

In Step S53, if the first measurement value (M1) being the amount of energy of the laser beam passing through the small-diameter hole S is less than the third reference value (e.g., 42 W) (NO in Step S53), the procedure proceeds to Step S55. In Step S55, the window absorption/scattering determining section 75 determines absorption or scattering of the laser beam due to contamination of the window 2 by comparing the second measurement value (M2) being the amount of energy of the laser beam absorbed by the plate 15 with the fifth reference value (e.g., 7 W) predetermined depending on the type of contamination of the external optical system 12 and greater than the second reference value. In Step S55, if the second measurement value (M2) being the amount of energy of the laser beam absorbed by the plate 15 is equal to or greater than the fifth reference value (e.g., 7 W) (NO in Step S55), the laser beam is determined as being scattered by contamination of the window 2, and in Step S56, the warning unit 23 issues a warning message about contamination of the lens 1 and scattering due to the window 2. Scattering due to the window 2 is highly likely to be caused by dust burnt to be stain on the window 2, so that the window 2 is checked by the operator, and in the case where there is contamination, replacement of the window 2 is prompted, and in the case where there is no contamination, checking of the lens 1 is prompted. In Step S55, if the second measurement value (M2) being the amount of energy of the laser beam absorbed by the plate 15 is less than the fifth reference value (e.g., 7 W) (YES in Step S55), the laser beam is determined as being absorbed due to contamination of the window 2, and in Step S57, the warning unit 23 issues a warning message about contamination of the lens 1 and absorption due to the window 2. Absorption due to the window 2 is highly likely to be caused by dust accumulated on the surface of the window 2, so that the window 2 is checked by the operator, and in the case where there is contamination, cleaning of the window 2 is prompted, and in the case where there is no contamination, checking of the lens 1 is prompted. After the window 2 is replaced or cleaned and the lens 1 is checked, the focus shift adjusting part 61 starts focus shift adjustment before laser machining again. This laser machining device 60 can automatically adjust a focus shift depending on the type and level of contamination of the external optical system 12 before laser machining. Thus, automatic operation can continue even if the external optical system 12 is contaminated, and the timing of cleaning or replacement of the external optical system 12 can be delayed.

The computer-executable program of the above-described embodiments can be provided by recording the program in a computer-readable non-transient recording medium, a CD-ROM, or the like. While the invention has been described with reference to various embodiments, it will be understood that the present invention is not limited to those embodiments and that various modifications may be made thereto without departing from the scope of the following claims.

The invention claimed is:

1. A laser machining method executed by a laser machining device configured to perform laser machining to a workpiece after measuring an amount of focus movement due to contamination of an optical system to compensate a focus position, the laser machining method comprising, before laser machining:
   (a) issuing a command to emit a laser beam with a high power to the extent used for laser machining, toward a laser beam elimination part capable of eliminating the laser beam in order to warm up an external optical system configured to guide a laser beam from a laser oscillator to concentrate the laser beam on a surface of a workpiece;
   (b) after the external optical system is warmed up, issuing a command to adjust a focus position on a surface of a plate disposed in a position different from a position of the laser beam elimination part and having a small-diameter hole and a command to align an optical axis of the laser beam with a center of the small-diameter hole;
   (c) in a state where the external optical system is warmed up, issuing a command to emit a laser beam with a low power to the extent that the plate is not melted or deformed;
   (d) in a state where the external optical system is warmed up, measuring an amount of energy of the laser beam passing through the small-diameter hole as a first measurement value;
   (e) calculating an amount of focus movement on a basis of the first measurement value measured in a state where the external optical system is warmed up and a first reference value predetermined depending on a type of contamination of the external optical system in relation to the first measurement value; and
   (f) compensating a focus position in laser machining on a basis of the calculated amount of focus movement.

2. The laser machining method of claim 1, further comprising:
   (m) before the external optical system is warmed up, issuing a command to adjust a focus position on the surface of the plate having the small-diameter hole and a command to align an optical axis of a laser beam with the center of the small-diameter hole;
   (n) before the external optical system is warmed up, issuing a command to emit a laser beam with a low power to the extent that the plate is not melted or deformed;

(o) in a state where the external optical system is not warmed up, measuring an amount of energy of the laser beam passing through the small-diameter hole as a second measurement value; and (p) determining contamination of a window in the external optical system on a basis of the second measurement value measured in a state where the external optical system is not warmed up and a second reference value predetermined depending on a type of contamination of the external optical system.

3. The laser machining method of claim 1, further comprising (q) after the focus position is compensated, determining whether a compensation amount is correct by repeating step (a) of warming up the external optical system to step (f) of compensating the focus position.

4. The laser machining method of claim 3, further comprising (r), in a case where the compensation amount is not correct after step (q) of repeating, increasing a power condition in laser machining.

5. A laser machining method executed by a laser machining device configured to perform laser machining on a workpiece after measuring an amount of focus movement due to contamination of an optical system to compensate a focus position, the laser machining method comprising, before laser machining:

(a) issuing a command to emit a laser beam with a high power to the extent used for laser machining toward a laser beam elimination part capable of eliminating the laser beam in order to warm up an external optical system configured to guide a laser beam from a laser oscillator to concentrate the laser beam on a surface of a workpiece;

(b) after the external optical system is warmed up, issuing a command to adjust a focus position on a surface of a plate disposed in a position different from a position of the laser beam elimination part and having a small-diameter hole and a command to align an optical axis of the laser beam with a center of the small-diameter hole;

(c) in a state where the external optical system is warmed up, issuing a command to emit a laser beam with a low power to the extent that the plate is not melted or deformed;

(d) in a state where the external optical system is warmed up, measuring an amount of energy of the laser beam passing through the small-diameter hole as a first measurement value;

(g) issuing a command to move the focus position to an upward position and a downward position from the surface of the plate;

(h) issuing a command to emit a laser beam with the low power in a state where the focus position is adjusted to each of the upward position and the downward position;

(i) measuring an amount of energy of the laser beam passing through the small-diameter hole as a third measurement value in a state where the focus position is adjusted to each of the upward position and the downward position;

(j) generating a graph including the first measurement value measured in a state where the focus position is adjusted on the surface of the plate, and the third measurement value measured in a state where the focus position is adjusted to each of the upward position and the downward position from the surface of the plate, the graph being based on a type and level of contamination of the external optical system;

(k) calculating a focus position from the graph and calculating an amount of focus movement on a basis of a difference between the calculated focus position and the focus position commanded to adjust on the surface of the plate; and (f) compensating a focus position in laser machining on a basis of the calculated amount of focus movement.

6. A laser machining method executed by a laser machining device configured to perform laser machining to a workpiece after measuring an amount of focus movement due to contamination of an optical system to compensate a focus position, the laser machining method comprising, before laser machining:

(a) issuing a command to emit a laser beam with a high power to the extent used for laser machining toward a laser beam elimination part capable of eliminating the laser beam in order to warm up an external optical system configured to guide a laser beam from a laser oscillator to concentrate the laser beam on a surface of a workpiece;

(b) after the external optical system is warmed up, issuing a command to adjust a focus position on a surface of a plate disposed in a position different from a position of the laser beam elimination part, having a small-diameter hole, and capable of absorbing a laser beam, and a command to align an optical axis of the laser beam with a center of the small-diameter hole;

(c) in a state where the external optical system is warmed up, issuing a command to emit a laser beam with a low power to the extent that the plate is not melted or deformed;

(d) in a state where the external optical system is warmed up, measuring an amount of energy of the laser beam passing through the small-diameter hole as a first measurement value;

(s) in a state where the external optical system is warmed up, measuring an amount of energy of the laser beam absorbed by the plate as a second measurement value;

(t) determining whether the external optical system is contaminated by comparing the first measurement value being the amount of energy of the laser beam passing through the small-diameter hole with a first reference value predetermined depending on a type of contamination of the external optical system;

(u) determining contamination of only a window in the external optical system by comparing the second measurement value being the amount of energy of the laser beam absorbed by the plate with a second reference value predetermined depending on the type of contamination of the external optical system;

(v) determining contamination of only a lens in the external optical system by comparing the first measurement value being the amount of energy of the laser beam passing through the small-diameter hole with a third reference value predetermined depending on the type of contamination of the external optical system and less than the first reference value;

(w) in a case where only the lens in the external optical system is contaminated, calculating an amount of focus movement on a basis of the second measurement value being the amount of energy of the laser beam absorbed by the plate, a fourth reference value predetermined depending on a contamination level of the external optical system, and an amount of focus movement predetermined depending on the fourth reference value; and (f) compensating a focus position in laser machining on a basis of the calculated amount of focus movement.

\* \* \* \* \*